(12) United States Patent
Barshinger et al.

(10) Patent No.: US 11,268,936 B2
(45) Date of Patent: Mar. 8, 2022

(54) HIGH-TEMPERATURE ULTRASONIC SENSOR

(71) Applicant: SENSOR NETWORKS, INC., Boalsburg, PA (US)

(72) Inventors: James Barshinger, State College, PA (US); Mark Feydo, Reedsville, PA (US); Jeffrey Anderson, Lewistown, PA (US)

(73) Assignee: SENSOR NETWORKS, INC., State College, PA (US)

( * ) Notice: Subject to any disclaimer, the term of this patent is extended or adjusted under 35 U.S.C. 154(b) by 104 days.

(21) Appl. No.: 16/476,729

(22) PCT Filed: Jan. 9, 2018

(86) PCT No.: PCT/US2018/012964
§ 371 (c)(1),
(2) Date: Jul. 9, 2019

(87) PCT Pub. No.: WO2018/129530
PCT Pub. Date: Jul. 12, 2018

(65) Prior Publication Data
US 2019/0360974 A1    Nov. 28, 2019

Related U.S. Application Data

(60) Provisional application No. 62/444,037, filed on Jan. 9, 2017.

(51) Int. Cl.
*G01N 29/24*    (2006.01)
*G01N 29/32*    (2006.01)
(Continued)

(52) U.S. Cl.
CPC .......... *G01N 29/228* (2013.01); *G01K 13/00* (2013.01); *G01N 29/07* (2013.01); *G01N 29/245* (2013.01);
(Continued)

(58) Field of Classification Search
CPC .... G01N 29/228; G01N 29/07; G01N 29/245; G01N 29/2468; G01N 29/326; G01N 29/2462
(Continued)

(56) References Cited

U.S. PATENT DOCUMENTS 3,423,993 A * 1/1969 Lynnworth ........ G01N 29/2493
73/639
4,374,477 A * 2/1983 Kikuchi .................. G01F 1/667
310/346
(Continued)

FOREIGN PATENT DOCUMENTS

JP    2005354281    12/2005

OTHER PUBLICATIONS

International Preliminary Report on Patentability dated Jul. 9, 2019 for International Application No. PCT/US18/12964.
(Continued)

*Primary Examiner* — Lisa M Caputo
*Assistant Examiner* — Rose M Miller
(74) *Attorney, Agent, or Firm* — FisherBroyles LLP

(57) ABSTRACT

A sensor for ultrasonically measuring a portion of a structure having a temperature significantly above room-temperature, the sensor comprising: a high-temperature portion for intimate contact with the structure, the high-temperature portion comprising at least: at least one transducer for converting a first signal to an ultrasonic transmit signal, and for converting an ultrasonic reflected signal to a second signal; a low-temperature portion comprising at least: at least one
(Continued)

digital sensor interface (DSI) to which the transducer is electrically connected, the DSI being configured to transmit the first electrical signal and receive the second electrical signal, and to generate an A-scan signal based on the first and second electrical signals; a wireless interface for transmitting a digital signal based directly or indirectly on at least said A-scan signal; and a battery for powering the DSI and the wireless interface; and an elongated member containing one or more electrical conductors for conducting the first and second signals between the transducer and the DSI, the elongated member being configured to offset the low-temperature portion a sufficient distance away from the high-temperature portion such that the low-temperature portion is subjected to significantly less heat from the structure compared to the high-temperature portion.

19 Claims, 2 Drawing Sheets

(51) Int. Cl.
*G01N 29/22* (2006.01)
*G01K 13/00* (2021.01)
*G01N 29/07* (2006.01)

(52) U.S. Cl.
CPC ....... *G01N 29/2468* (2013.01); *G01N 29/326* (2013.01); *G01N 29/2462* (2013.01)

(58) Field of Classification Search
USPC .......................................................... 73/617
See application file for complete search history.

(56) References Cited

U.S. PATENT DOCUMENTS

| | | |
|---|---|---|
| 4,783,997 A | 11/1988 | Lynnworth |
| 10,247,705 B2 | 4/2019 | Pellegrino |
| 2003/0212505 A1* | 11/2003 | Rojas .................... C21C 5/4673 |
| | | 702/39 |
| 2011/0090935 A1 | 4/2011 | Cuffe |
| 2014/0312739 A1 | 10/2014 | Bar-Cohen |
| 2015/0285908 A1* | 10/2015 | Tikhomirov ............ G01S 7/521 |
| | | 367/87 |
| 2016/0109411 A1 | 4/2016 | Pellegrino |
| 2016/0274065 A1 | 9/2016 | Pellegrino |
| 2017/0108471 A1* | 4/2017 | Sturtevant ............ G01N 29/222 |
| 2018/0164258 A1 | 6/2018 | Feydo |

OTHER PUBLICATIONS

International Search Report for International Application No. PCT/US18/12964 dated Jun. 29, 2018.
Written Opinion of the International Searching Authority for International Application No. PCT/US18/12964 dated Jun. 29, 2018.
Extended European Search Report dated Aug. 10, 2020 in European Application No. 18736125.8.

* cited by examiner

HIGH-TEMPERATURE ULTRASONIC SENSOR

REFERENCE TO RELATED APPLICATION

This application is based on U.S. Provisional Application No. 62/444,037, filed Jan. 9, 2017, and is hereby incorporated by reference.

FIELD OF INVENTION

This invention relates to a device for ultrasonically monitoring the condition and integrity of pipes and/or other structures or assets at high-temperatures, such as those used in the oil and gas and power generation industries.

BACKGROUND

Wall thickness and the presence of defects such as cracks are important factors in determining the fitness-for-service of structures such as above- and below-ground pipes and tanks, including bulk material and weldments. When a pipe is in operation, it can be subject to corrosion and/or erosion due to the content, flow and/or environmental conditions inside or outside of the pipe. Cracks can form and propagate due to the presence of manufacturing defects, creep, thermal cycling, fatigue and environmental conditions causing defects such as high-temperature hydrogen attack (HTHA), stress-corrosion cracking, etc. Corrosion and/or erosion results in the reduction in wall thickness, which can reach a point at which operating conditions becomes unsafe, considering that the pipe can be pressurized and may contain hazardous or flammable materials. Likewise formation and propagation of cracks, in welds for instance, can cause similar unsafe conditions. A failure may cause catastrophic consequences such as loss of life and environmental damage, leaking pipes, in addition to the loss of the use of the asset, and any corresponding costs associated with repair, loss of capacity and revenue loss.

Ultrasonic non-destructive evaluation (NDE) techniques are commonly used for evaluating the integrity of industrial components. In the case of measuring wall thickness reduction due to erosion/corrosion, the traditional process involves using an ultrasonic transducer (probe) to measure the wall thickness. The instrument excites the probe via an electrical pulse, and the probe, in turn, generates an ultrasonic pulse which is transmitted through the structure. The probe also receives an echo of the ultrasonic pulse from the structure, and converts the pulse back into an electrical signal. The ultrasonic pulses that are transmitted into and received from a structure are used to determine the relative position of the surfaces (i.e. thickness) of the structure wall. More specifically, by knowing the travel time of the ultrasonic pulse from the outer wall to the inner wall and back ($\Delta T$) and acoustic velocity (V) of the ultrasonic pulse through the material of the structure (through calibration or just initialization), a wall thickness (d) can be calculated—i.e. $d=\Delta T*V/2$. Successively measuring the thickness change over time allows for the calculation of a corrosion (erosion) rate for the asset. There are many variants of these two basic descriptions of ultrasonic thickness gauging and flaw detection that are known to skilled practitioners of ultrasonic nondestructive evaluation.

Traditionally, an ultrasonic NDE approach involved an operator manually positioning a probe on the wall of the asset to take a reading. Not only does this necessitate the operator manually taking each reading, but also the measurement location must be accessible, which can be challenging and costly. For example buried pipelines require excavation to access, insulated pipe requires costly removal of the insulation, offshore assets require helicopter or boat access, and elevated vessels requiring scaffolding or crane access. While the measurement is relatively simple, the cost of access (scaffolding, excavation, insulation removal, etc) is often much higher than the cost of measurement. Moreover, the operator is often subjected to hazardous conditions while taking the readings. Furthermore, to obtain trending data with thickness resolution of 0.001" or better requires that the transducer be placed in the same exact location for consistent readings at regular time intervals. This is difficult and often impractical especially when the data-capture rate needs to be frequent. Variations in operator and/or equipment also tend to skew the quality and integrity of the measurement data.

One approach for avoiding some of the aforementioned problems is to use installed sensors/systems for asset-condition or asset-integrity measurement. The sensors are permanently or semi-permanently installed on the asset and can take advantage of features such as wireless data transmission to avoid costly wiring installations. Automated systems require no operator to be in the vicinity of the asset and can stream data to a control room or to an operator's desk. Current state of the art devices/systems have been shown to be useful and commercially successful for permanently monitoring structures using ultrasound.

While current state of the art devices are useful and valued for corrosion monitoring, the applicants have identified several shortcomings for existing solutions, particularly for measuring high temperature monitoring.

An important requirement for ultrasonically monitoring structures in oil and gas (O&G) and power generation facilities is a transducer that can withstand very high-temperatures in the range of 300 to 500° C. For example, many piping circuits in a catalytic cracking unit operate in this temperature range. The traditional approach for measuring high-temperature structures is to use portable devices for manual thickness measurement. These devices are designed to operate in this temperature range only for a short duration at a low duty cycle, and must be removed from the high-temperature structure before the device heats up because the transducer is not constructed to withstand such temperatures.

In an installed sensor scenario, the transducer, if placed in contact with the pipe will achieve nominally the same temperature as the pipe and therefore must be designed to withstand the operating temperature of the pipe or asset. Typically, this involves a specialty designed high-temperature sensor which is cabled to electronics that are located remotely away from the high-temperature structure being monitored. A major disadvantage of installed sensor systems with wired transducers is the cost of long cabling, connectors, cable installation and signal degradation. Cabling with suitable electrical characteristics and appropriate for the harsh environments can cost several dollars per foot. Coaxial connectors are also expensive from both a part and assembly cost. Cable and connector costs can easily exceed $50-100. The high-frequency signals that connect the probe to its ultrasonic instrument degrade considerable over distances as short as 8 meters. Labor costs for the type of industrial wiring and conduits at Oil & Gas or Power Plant sites often renders wiring too costly to be practical especially for semi-permanent installations. Additionally, the cable tends to pose a risk of snagging, and thereby becoming disconnected form the sensors/electronics.

Alternatively, the transducer can be placed remotely, at a distance from the pipe, and a waveguide can be used to direct the ultrasonic energy to the surface of the structure. A commercial product by Permasense offers this type of solution. While this approach solves the issue of maintaining an appropriately lower temperature of the transducer and electronics, it is generally substandard in ultrasonic performance. The use of a waveguide requires lower ultrasonic frequencies that degrade the ability to resolve small wall thicknesses. Furthermore, the end of the waveguide ultrasonically presents a line source/receiver that has poor directivity, resulting in a large ultrasonic spot size in the component. This reduces the ability of the system to resolve small changes in wall thickness.

Therefore, Applicants have identified the need for a high-temperature, ultrasonic thickness gauging sensor that can be permanently installed directly on the surface of a high-temperature structure without the need for waveguides, while avoiding the complexity, inconvenience and cost of cables. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention relates to a permanently-installed sensor which is configured to withstand very high-temperatures by segregating the sensor into a two different portions—i.e., a high-temperature portion, containing a high-temperature transducer configured for contact with the high-temperature structure, and a low-temperature portion, offset from the high-temperature portion, and containing heat-sensitive electronics that capture, process, and transmit the ultrasonic signals. The offset is sufficient to place the heat-sensitive components beyond the high temperature of the structure. Thus, commercially available electronic sensor components can be used in the sensor. Furthermore, in one embodiment, the low-temperature portion also contains a wireless interface and battery, thereby avoiding the need to interconnect the sensors with cables as discussed above.

The high-temperature sensor of the present invention provides for a number of significant benefits. For example, the high-temperature portion comprises a transducer that is configured to contact the high-temperature structure directly, and thus transmit and receive ultrasonic signals directly to and from the surface of the structure, thereby avoiding the use of waveguide as describe above, which can degrade the quality of the ultrasonic signal. Additionally, in one embodiment, the sensor is battery operated and wireless and thus can be installed without the cost and inconvenience of having to run cables. In yet another embodiment, the high-temperature and low-temperature portions are connected with a rigid elongated member, thereby providing a unitary, discrete sensor which can be readily attached to a structure. Still other benefits will be obvious to those of skill in light of this disclosure. Accordingly, one aspect of the invention is a high-temperature sensor having a high-temperature portion and a low-temperature portion, offset form the high-temperature portion for containing the heat-sensitive components of the sensor. In one embodiment, the sensor comprises: (1) a high-temperature portion for intimate contact with the structure, the high-temperature portion comprising (i) at least one transducer for converting a first signal to an ultrasonic transmit signal, and for converting an ultrasonic reflected signal to a second signal; (2) a low-temperature portion comprising (i) at least one digital sensor interface (DSI) to which the transducer is electrically connected, the DSI being configured to transmit the first electrical signal and receive the second electrical signal, and to generate an A-scan signal based on the first and second electrical signals; and (ii) a wireless interface for transmitting a digital signal based directly or indirectly on at least the A-scan signal; and (3) an elongated member containing one or more conductors for conducting the first and second signals between the transducer and the DSI and configured to offset the low-temperature portion a sufficient distance away from the high-temperature portion such that the low-temperature portion is subjected to significantly less heat from the structure compared to the high-temperature portion.

DETAILED DESCRIPTION

Figure 1:
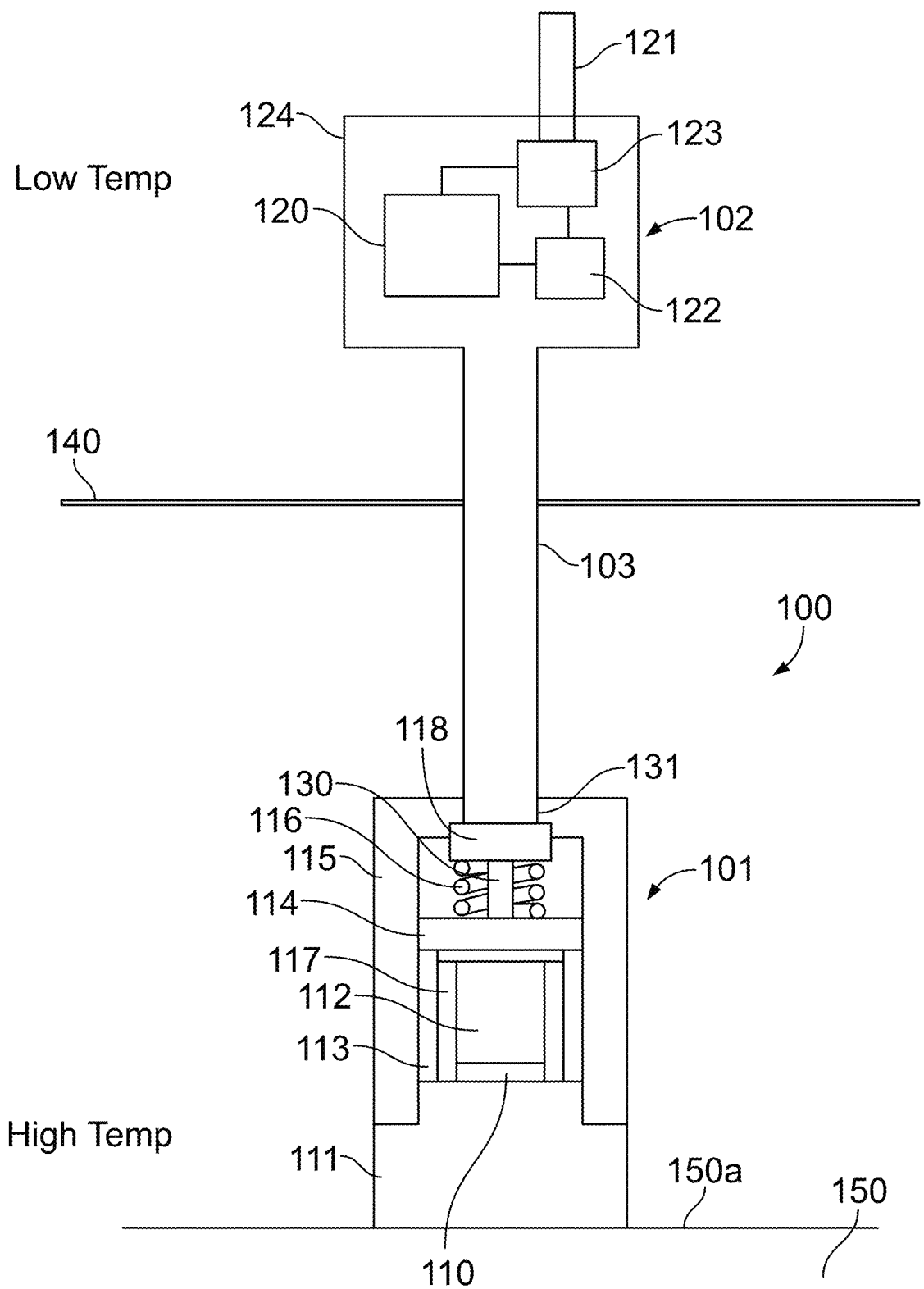
FIG. 1 shows a cross section of one embodiment of the sensor of the present invention.

Referring to FIG. 1, one embodiment of a sensor 100 of the present invention is shown. The sensor is configured for ultrasonically measuring a portion of a structure 150 having a temperature (e.g., 300 to 500° C.) significantly above room-temperature. The sensor comprises: a high-temperature portion 101 for intimate contact with the structure and a low-temperature portion 102 offset from the high-temperature structure. The high-temperature portion 101 comprises at least one transducer 110 for converting a first signal to an ultrasonic transmit signal, and for converting an ultrasonic reflected signal to a second signal. The low-temperature portion 102 comprises at least one digital sensor interface (DSI) 120 to which the transducer 110 is electrically connected. The DSI 120 is configured to transmit the first electrical signal and receive the second electrical signal, and to generate an A-scan signal based on the first and second electrical signals. The low-temperature portion in this embodiment also comprises a wireless interface 122/121 for transmitting a digital signal based directly or indirectly on at least the A-scan signal. The high and low-temperature portions are connected by an elongated rigid member 103. The member 103 is configured to space the low-temperature portion 102 a sufficient distance away from the high-temperature portion 101 such that a significant portion of heat from the structure 150 does not reach the low-temperature portion. The elongated rigid member contains one or more conductors 130 for conducting the first and second signals between the transducer and the DSI.

Importantly, the transducer is constructed as a simple mechanical construction with no bonded materials and all transducer materials are selected of inorganic substances that are not subject to significant degradation at the maximum temperature of operation. Conversely, standard UT transducers are stacked construction of matching layers, piezoceramic, electrodes, backing materials and so on, such components being assembled with adhesives such as structural epoxies. These adhesive materials and some of acoustic materials are organic materials and are subject to varying amounts of degradation when temperatures exceed about 200° C. Furthermore, the rigid bonds do not allow for free expansion and contraction as the temperature of the transducer changes. This creates stresses that tend to cause delamination of the components after many temperature cycles.

To address this, in one embodiment, the disclosed transducer comprises a metallic delay line 111 that is used to couple sound from the piezoelectric element 110 to the structure surface 150a. A delay line type of transducer is not necessarily configured to thermally separate the element from the high-temperature pipe, but rather to provide for an ultrasonic entry echo that provides an accurate timing reference for the wall thickness measurement. The delay line is generally cylindrical in shape but could be other shapes and/or could contain mounting features such as flanges. The delay line has two important surfaces—in the case of the exemplary cylindrical geometry, these surfaces are the ends of the cylinders. Each surface is prepared such that it is flat to less than approximately 1 wavelength of green light (510 nm) so that they are conducive to dry coupling the delay line to the asset on one end and to the ultrasonic element on the other.

The piezoelectric element 110 is affixed to the delay line 111. An important aspect of the piezoelectric element is that it has a curie temperature that is preferably twice that of the operating temperature. Exemplary element materials include, for example, Lithium Niobate, Aluminum Nitride and YCOB. The element does not have any electrodes in that the delay line and backing materials 112 (described below) are conductive and therefore provide the electrical connection to the element. The element is prepared to be flat and parallel to less than approximately 1 wavelength of green light in order to dry couple the element to the delay line and backing. Importantly, it should be noted that even small air gaps can block the transmission of ultrasonic energy between the ceramic and delay line and therefore maintaining smooth, flat and polished surfaces is important. A pressurization assembly is typically used to compress the piezoelectric element against the delay line to ensure an acoustical coupling.

The high-temperature portions, in one embodiment, comprises additional components, including, for example, the backing element 112, electrical contact 117, insulating sleeve 113, and washer 114, spring 116 and threaded plunger 118. These components are contained within a housing 115 which is mechanically attached to the delay line 111.

The backing 112 is an important component in that it must be conductive in order to provide an electrode of the element. Additionally, because it is in contact with the piezoelectric element it can conduct ultrasound and therefore cause noise echoes in the transducer. Therefore, the material should be lossy to the transmission of ultrasound. The material should also be strong enough to withstand the mechanical load that is applied through it to the piezoelectric material. The inventors have found that a partially sintered, powder metal compact containing at least 10% porosity provides suitable results, although other embodiments are possible. High strength, high-temperature alloys such as Inconel are also preferred.

Electrical conductors 130 are electrically connected to the backing 112. The electrical conducts 130 comprise a high-temperature wire such as a nickel or nichrome wire. The electrical connection can be accomplished by brazing the wire directly to the backing or it can be accomplished mechanically with a separate electrical contact 117 that is also conductive and provides an electrical attachment via welding, brazing or threaded fastener. In an exemplary embodiment, the electrical attachment is a metallic cup that contains the backing. This mechanically constrains the backing from lateral expansion.

In one embodiment, an insulating ring 113 and washer 114 are used to center the assembly and electrically isolate it from the other transducer components. Generally, the case 115 and delay line 111 comprise components having one electrical potential (ground) and the backing and contact components are at another potential (hot). These insulating components should be made of high-temperature, inorganic materials such as Macor, Alumina, or some other high-temperature ceramic material.

A spring 116 and plunger 118 are used to urge the above-mentioned components together. Specifically, the spring allows for axial expansion and contraction of the transducer and must be constructed of high-temperature materials such as Inconel. The plunger could be in several forms but generally is a threaded component that compresses the entire stack as it is tightened. In an exemplary embodiment the plunger is hollow to allow the electrical conductors 130 to pass through.

A wireless transducer implies that electronics, including a microcontroller, pulser/receiver, wireless transceiver, battery, etc are integrated with the transducer in one physical housing. Since these components are not available rated to withstand the required operating temperature, it is necessary to construct the transducer such that the electronics are positioned far enough away from the operating to achieve an operating temperature that is acceptable. Thus, while the disclosed transducer can operate at very high-temperatures (500° C.), the upper operating temperature of typical electronics and batteries is 65° C., more or less.

Accordingly, the high and low-temperature portions are connected by an elongated member 103, thereby offsetting the low-temperature portion from the structure 150, and away from the heat. The elongated member must be long enough to place the electronics in a more temperate zone than the surface of the asset being measured. Typically, the offset distance is approximately 5 to 100 cm, 10 to 50 cm, or 20 to 40 cm, greater than 5 cm, greater than 10 cm, greater than 20 cm, less than 100 cm, less than 80 cm, less than 60 cm, less than 50 cm, less than 40 cm, or about 30 cm, but could vary in design based on the use case of the transducer (pipe temperature, insulation, ambient temperature, etc.).

In one embodiment, the attachment between transducer is rigid, so that the attachment of the transducer to the pipe constitutes the complete mounting of the transducer and electronics. The rigid attachment is composed of a tubular structure and can be designed to be a separate mechanical component from the transducer and electronics housings or it can be integral. Optionally, a heat shield, 140, could be placed on the rigid attachment member between the transducer and sensor electronics to further isolate the temperature.

Importantly, in one embodiment of the invention, the sensor incorporates a temperature measurement device in or near the ultrasonic transducer in order to monitor the temperature of the test subject 150. Temperature measurement is necessary because the ultrasonic velocity of the test subject is dependent on the temperature, causing shifts in temperature to appear as changes in wall thickness. The magnitude of the effect is approximately 1% change in reading per 55 degrees C. A sensor incorporating a temperature measurement device allows for the temperature effect to be removed. Typical temperature measurement devices that could be incorporated in the ultrasonic sensor include thermocouples and resistance temperature devices (RTDs). The temperature measurement device is installed in the high temperature portion of the sensor and is wired back to the sensing electronics in the low temperature portion through elongated member.

The sensor electronics of the present invention is similar, in many respect to that disclosed in 2016/0274065, application Ser. No. 14/839,694, and application Ser. No. 15/841,040, all of which are hereby incorporated by reference in their entirety, including those references incorporated by reference therein.

The low-temperature portion typically contains the digital sensor interface, DSI 120, battery 122, wireless transceiver 123 and antenna 121. The DSI 120 may comprise following general functional blocks: pulser circuit, receiver circuit containing at minimum an antialiasing filter and amplifier, A/D converter, and microprocessor. The enclosure 124 could be one or several pieces and could be constructed of metal or plastic as is suitable.

Figure 2:
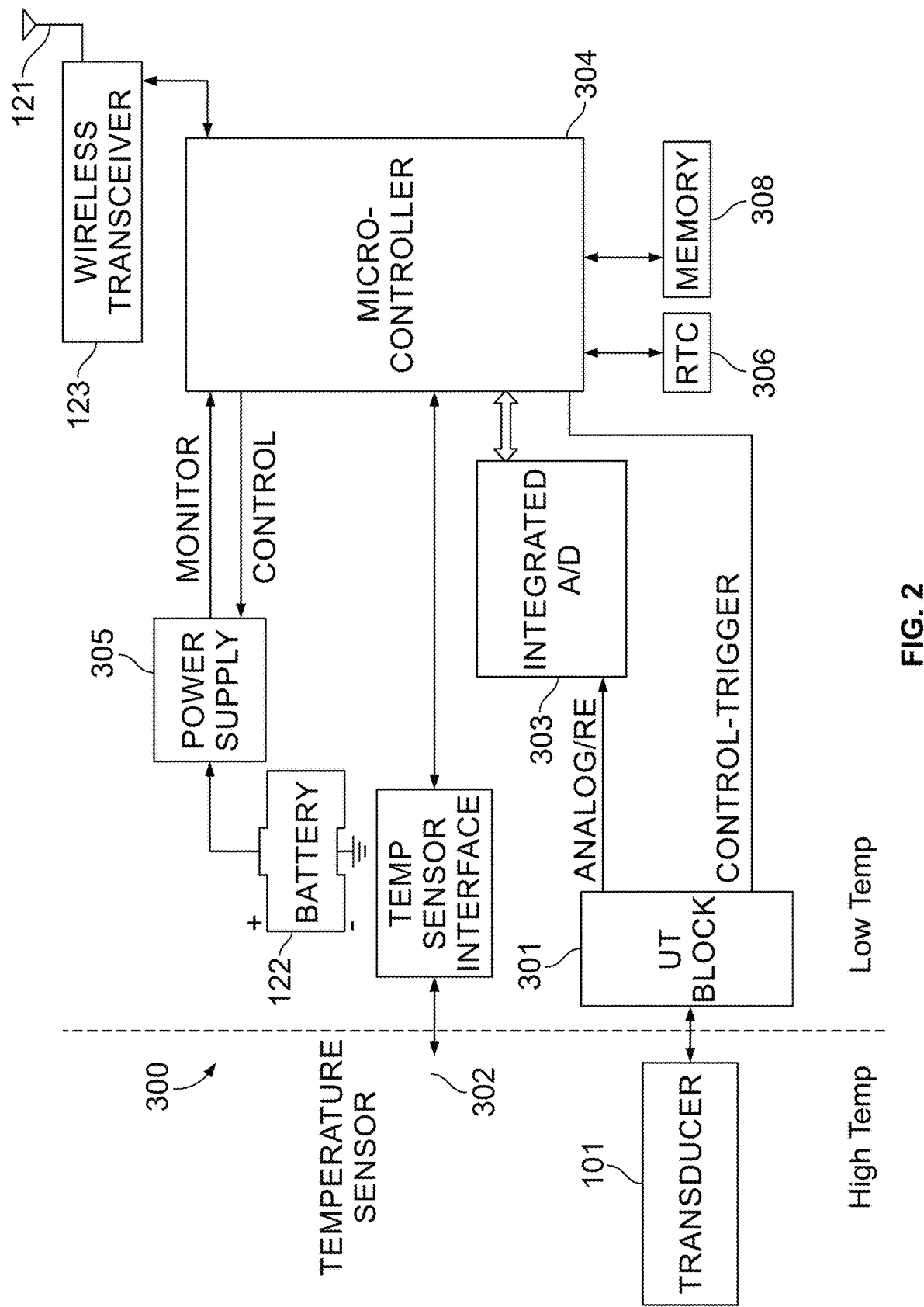
FIG. 2 shows a block diagram of a specific embodiment of the high temperature sensor.

Referring to FIG. 2, a block diagram of a specific embodiment of the high temperature sensor is shown. A transducer 101 in the high-temperature portion is integrated with a DSI 300 in the low temperature portion to form a unitary sensor as shown in FIG. 1. In one embodiment, the DSI comprises transmit and receive circuitry in the form of a UT Block 301, which includes a pulser circuit to excite the ultrasonic transducer and a receiver circuit composed of one or more voltage controlled amplifiers (VCA) to amplify and condition the received signal prior to digitization. Additionally, analog filter circuits such as a low pass anti-aliasing filter and high pass filter may be included. A trigger circuit is provided from the microcontroller to fire the pulser. The microcontroller governs the timing of trigger pulses and implements the aforementioned ETS scheme. The UT pulser is either constructed to produce a low voltage square wave excitation or is designed as a "ring up" type of pulser to produce a higher voltage excitation. The receiver circuit contains one or more stages of amplification and attenuation to appropriately size the incoming voltage waveform prior to digitization. The receiver section may also contain analog filters to condition the signal and may implement highpass, low pass or band pass filters.

The analog signal from the UT block 301 feeds into an A/D converter 303, which, in one embodiment, is integrated into the processor 304, to convert the analog voltage waveform to a digital signal. The raw data as well as other outputs and/or results are then sent to an attached microcontroller 304. The microcontroller serves to manage operation of the DSI including power management through activating the various blocks of the circuit when needed.

A wireless transceiver 123 is either integrated within the MCU or is provided as a separate module to provide the functionality of data transmission. The transceiver can be implemented with known wireless communication technologies including, for example, ISA100, WirelessHART, LORA, Wi-Fi, cellular, telemetry, Blue Tooth, Blue Tooth Low Energy, ZigBee, Z-wave, and any other known wireless communication technology. It is particularly advantageous to use a technology such as LORA which has a long range, star topology as the device and radio can maintain a low-power state at all times that the individual device is not being required to measure and transmit as opposed to a mesh network where the transceiver must always be in a state where it is prepared to relay messages from other devices. The transceiver is connected to an antenna that is either internally or externally mounted to the device, or alternatively the antenna connection is routed to an external RF connector for attachment to a remote antenna. The use of a remote antenna can be advantageous for difficult RF environments.

Additionally, in one embodiment the DSI also comprises various peripheral components to the microprocessor, including, for example, a Real Time Clock 306, temperature sensor interface 307, and serial EEPROM memory 308.

Because of the sensor's modularity, the process for converting the A-scan signal to thickness data can be performed anywhere in the sensor or outside the sensor (e.g., in the Cloud or discrete device that is wireless connected to the sensor). For example, the DSI can be configured to generate the thickness data from the A-scan signal, or, alternatively, the sensor may transmit the information for processing elsewhere. Generally, determining when and where to calculate the thickness data from the A-scan signal is a question of optimization. For example, it may be preferable to convert the A-scan signal to thickness data in the DSI to save on storage space/transmission energy because the A-scan signal data consumes more space than the thickness data. On the other hand, converting this signal to thickness data tends to require more processing power. Generally, although not necessarily, sophisticated calculations such as phased array, full matrix capture, and total focusing method calculations and/or data analysis tends to be better suited for implementation in the cloud. In addition, a cloud based service is well suited to calculating and communicating alarms derived from the inspection results through media such as text messaging or email.

In one embodiment, the transceiver transmits the A-scan signal or similar signal in essentially "raw" form, along with the derived wall thickness data. For example, the A scan can be sent periodically (e.g., every 5th reading) for validation purposes, and/or upon an event (e.g. substantial change in results), again for validation.

In one embodiment, the processor is instructed to be configured to place the sensor in a low-power state between readings. In one embodiment, the processor is instructed to wake up from a low power state to initiate measure of the structure on a predetermined interval. For example, in one embodiment, the predetermined interval is between 1 minute and 1 year.

In one embodiment, the data signal is transmitted to a discrete wireless collection device. In one embodiment, the wireless collection device comprises a wireless gateway that is connected to a Local Area Network (LAN). In one embodiment, the gateway transmits the data signal across the LAN to a local server. Alternatively, in one embodiment, the gateway transmits the data signal across the LAN to a remote data server. In one embodiment, the server (local or remote) hosts a data viewing application. In one embodiment, the wireless collection device stores the data signal until the data signal is collected using a handheld data collection device. In one embodiment, the handheld data collection device is connected to the wireless data collection device using a cable or over a wireless link such as Wi-Fi or Bluetooth.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A sensor for ultrasonically measuring a portion of a structure having a temperature significantly above room-temperature, said sensor comprising:
- a high-temperature portion for contact with said structure, said high-temperature portion comprising at least:
  - at least one transducer for converting a first signal to an ultrasonic transmit signal, and for converting an ultrasonic reflected signal to a second signal;
- a low-temperature portion comprising at least:
  - at least one digital sensor interface (DSI) to which said at least one transducer is electrically connected, said at least one DSI being configured to transmit said first electrical signal and receive said second electrical signal, and to generate an A-scan signal based on said first and second electrical signals;
  - a wireless interface for transmitting a digital signal based directly or indirectly on at least said A-scan signal; and
  - a battery for powering said at least one DSI and said wireless interface; and
- an elongated member connecting said low-temperature portion and said high-temperature portion such that said elongated member, said low-temperature portion and said high-temperature portion form a discrete, unitary body, said elongated member also being sufficiently long to hold said low-temperature portion a sufficient distance away from said high-temperature portion such that said low-temperature portion is subjected to significantly less heat from said structure compared to said high-temperature portion.

2. The sensor of claim 1, wherein said high-temperature portion is subjected to a certain measure of heat from said structure when installed on said structure, and wherein said low-temperature portion is offset at a sufficient distance from said high-temperature portion such that said low-temperature portion is subjected to no more than 30% of said certain measure of heat from said structure.

3. The sensor of claim 1, wherein said elongated member is a rigid tube.

4. The sensor of claim 1, wherein said elongated member is 5 to 100 cm long.

5. The sensor of claim 4, wherein said elongated member is 10 to 50 cm long.

6. The sensor of claim 1, wherein said elongated member is integral with said high- and low-temperature portions.

7. The sensor of claim 1, wherein said elongated member is discrete from said high- and low-temperature portions.

8. The sensor of claim 7, wherein said elongated member has thread ends, and wherein said high- and low-temperature portions have threaded openings to receive said threaded ends, such that said elongated member forms said unitary sensor when in threaded engagement with said high- and low-temperature portions.

9. The sensor of claim 1, wherein each of said at least one transducer comprises:
- a delay line configured for contacting the structure;
- a piezoelectric material contracting said delay line;
- a backing around said piezoelectric material;
- an insulating material around at least a portion of said backing material;
- a spring urging said piezoelectric material into said delay line; and
- a case cooperating with said delay line to enclose said spring and said insulting material.

10. The sensor of claim 9 wherein the piezoelectric material is lithium niobate.

11. The sensor of claim 9 wherein the piezoelectric material is aluminum nitride.

12. The sensor of claim 9 wherein the piezoelectric material is bismuth titanate.

13. The sensor of claim 9, wherein the backing material is a partially sintered, powder metal compact.

14. The sensor of claim 9, wherein said at least one transducer is coupled together with pressure rather than with adhesive.

15. The sensor of claim 1, further comprising a temperature measurement device within said at least one transducer to measure the temperature of said portion of said structure.

16. The sensor of claim 15 wherein the temperature measurement device is a thermocouple.

17. The sensor of claim 15 wherein the temperature measurement device is a resistance temperature detector (RTD).

18. The sensor of claim 1, further comprising one or more electrical conductors for conducting said first and second signals between said at least one transducer and said at least one DSI.

19. The sensor of claim 18, wherein said one or more electrical conductors are contained within said elongated member.

* * * * *